United States Patent [19]
O'Brien et al.

[11] Patent Number: 5,802,729
[45] Date of Patent: Sep. 8, 1998

[54] APPARATUS FOR ASSISTING IN POSITIONING HANGING ARTICLES

[75] Inventors: Patrick D. O'Brien, 2200 Blaisdell Ave. #201, Minneapolis, Minn. 55401; Jeff A. Weber, Minneapolis, Minn.

[73] Assignee: Patrick D. O'Brien, Minneapolis, Minn.

[21] Appl. No.: 589,201

[22] Filed: Jan. 22, 1996

[51] Int. Cl.$^6$ .................................................. G01C 9/28
[52] U.S. Cl. ................................................. 33/371; 33/347
[58] Field of Search ............................... 33/347, 370, 371

[56] References Cited

U.S. PATENT DOCUMENTS

| | | | |
|---|---|---|---|
| 2,667,704 | 2/1954 | Dunn | 33/374 |
| 4,100,681 | 7/1978 | Hollander | 33/390 |
| 4,126,944 | 11/1978 | Burkhart | 33/371 |
| 4,208,802 | 6/1980 | Berndt | 33/371 |
| 4,228,982 | 10/1980 | Sellera | 33/370 |
| 4,473,957 | 10/1984 | Faulkner | 33/371 |
| 4,944,094 | 7/1990 | Depiano et al. | 33/371 |
| 5,063,679 | 11/1991 | Schwandt | 33/371 |
| 5,103,574 | 4/1992 | Levy | 33/760 |
| 5,165,650 | 11/1992 | Letizia | 248/476 |
| 5,209,449 | 5/1993 | Hart | 248/475.1 |

FOREIGN PATENT DOCUMENTS

| | | | |
|---|---|---|---|
| 555986 | 8/1932 | Germany | 33/347 |
| 584223 | 1/1947 | United Kingdom | 33/347 |

*Primary Examiner*—Thomas B. Will
*Attorney, Agent, or Firm*—John F. Klos

[57] ABSTRACT

A leveling device for assisting in properly orienting picture frames and other hanging articles on a vertical wall surface. Preferably, the device includes a planar body having a bubble level and a suction cup for temporarily affixing the device to a smooth surface of the frame, i.e. a glass pane. A foot surface and planar hooking structure provide alternative affixing structure such that the device can be used on a wide variety of frames and the like.

10 Claims, 3 Drawing Sheets

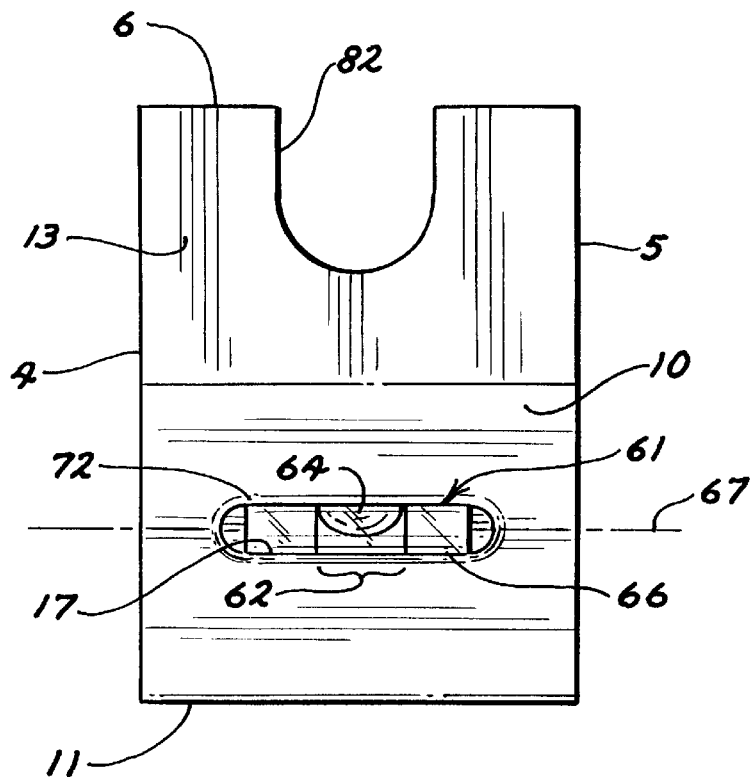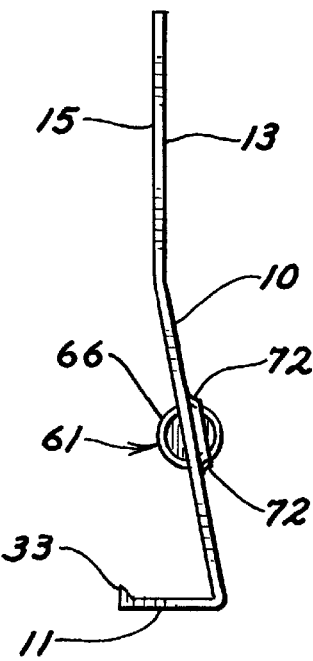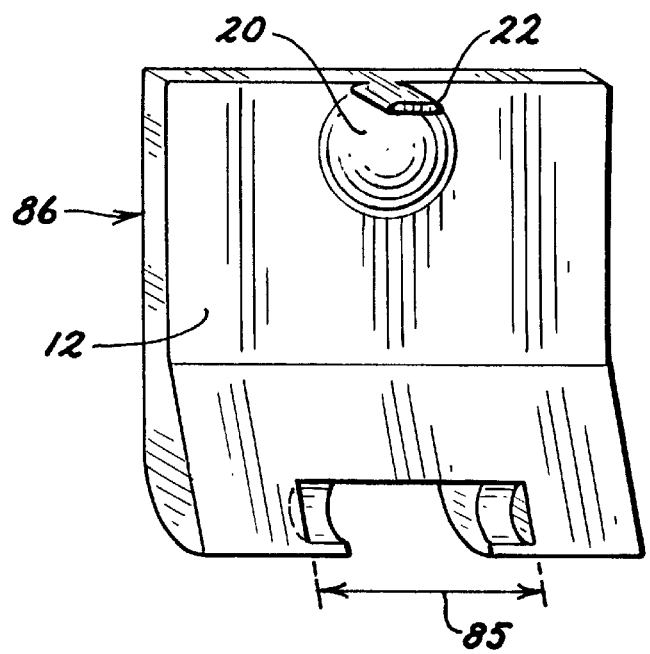

APPARATUS FOR ASSISTING IN POSITIONING HANGING ARTICLES

BACKGROUND OF THE INVENTION

1. Field of the Invention

The field of this invention relates to leveling devices, and more particularly to leveling devices used for assisting in fixedly fastening a picture frame or another hanging article to a vertical wall surface such that the picture frame or article is positioned in a substantially horizontal orientation with respect to the vertical wall surface.

2. Discussion of the Prior Art

The present invention relates to a leveling device for assisting in hanging pictures, posters, or other articles upon vertical wall surfaces. Generally, picture frames are rectangular in configuration, having parallel top and bottom edges that when mounted on a vertical wall surface are desirably positioned in a horizontal alignment with respect to the wall. Commonly, picture frames are removably fastened to the wall surface on a protruding nail or hanging bracket. Typically, a user hangs the picture on the nail or hanging bracket from a wire, cord, or a serrated hanging device fastened to a rear surface of the picture frame. The user then adjusts and manipulates the frame about the nail or hook bracket until the top and bottom edges are in a desired substantially horizontal orientation. This important last step of horizontally positioning the frame on the wall is often done visually, usually by positioning the frame with reference to visual cues such as the intersection of the vertical wall with the ceiling and floor or the wall corner intersections. Commonly the user hangs the picture on the nail or hanging bracket, makes an initial positioning of the frame on the wall, steps away from the frame to make a visual comparison of the frame with reference to the visual cues, and then returns to the frame to make an adjustment as required. The user typically continues this trial and error process until the desired picture orientation is obtained. Clearly, visual positioning of picture frames can be an inefficient process. Equally inefficient is a practice many people employ where hanging framed pictures involves a two person operation whereby one person stands away from the picture judging its angular orientation while another person adjusts the picture on the wall. Furthermore, visual positioning of frames proves especially frustrating and time consuming with grouped picture frames. Grouped frames are commonly positioned through another trial and error process; one typically cycles through the frames adjusting one or two at a time, visually comparing the frames as a group, then returning to adjust other frames as needed. The inefficiency of visually positioning picture frames and other hanging articles is often exasperating when the visual cues are obscured or are themselves out of alignment, for example when the walls, ceilings, or floors are uneven or out of level.

Another method of properly orienting frames involves the use of some type of leveling device. Bubble level devices have been used in the past to aid in positioning picture frames and other hanging articles. In general, the prior art bubble level device includes a substantially transparent vial containing a liquid, an air bubble, and a center window indicia, wherein the air bubble is positioned within the center window when the bubble level device is in a substantially horizontal angular alignment. Many bubble level devices are meant for precision leveling in construction and are generally too large and expensive to find utility in assisting in leveling picture frames. However, the prior art discloses bubble level devices specifically used to assist in leveling picture frames. Prior art devices typically include a longitudinally extending body with at least one flat surface. Typical of these devices is U.S. Pat. No. 5,080,317 to Letizia disclosing a body with a bubble level that is positionable on a flat edge of the picture frame. Similar to the torpedo level known to those persons skilled in the art, this device relies of the presence of a flat surface on the picture frame onto which the body is rested. In general, the prior art leveling devices are typically rested on or maintained against a flat surface of the frame to be positioned, with the user then rotating or otherwise adjusting the frame into horizontal alignment.

Users of the prior art leveling devices often find it desirable to make adjustments of the frame with both hands, especially when positioning heavy or cumbersome frames. A general shortcoming of many prior art bubble leveling devices is that positioning of framed articles involves a two-hand operation with the user required to position and maintain the device against a flat surface of the picture frame with one hand while adjusting the orientation of the frame with the other hand. For a variety of frames the prior art devices are simply too large to rest upon the frame without being maintained in place by the user during the leveling operation. Many prior art leveling devices have a shortcoming that frame positioning with both hands is possible for those frames which have a large enough flat surface capable of temporarily carrying the leveling device. As a result, many prior art bubble level devices are cumbersome or otherwise generally lack an ease of use with a variety of picture frames. Against this background the present invention addresses the problems possessed by the prior art devices. In particular, the present invention includes an assembly for leveling picture frames and the like that is temporarily affixed to the frame during the positioning operation that promotes ease of use and finds application for a variety of picture frames and other hanging articles. The present invention also attempts to improve upon the prior art devices by providing a leveling device that is compact, sturdy, and accurate.

SUMMARY OF THE INVENTION

The present invention comprises an apparatus for assisting in leveling picture frames, posters, and other hanging articles. Most simply stated, the present invention comprises a generally planar body having an affixed bubble level and a suction cup for temporarily affixing the body to a smooth inner surface of a frame, i.e., the glass pane. Preferably, the planar body is rectangular in form having flat peripheral leveling edges generally parallel to and orthogonal to the axis of the bubble level such that when the planar body is rested on or maintained against a flat edge of the frame the position of the air bubble within the bubble level corresponds to the overall angular alignment of frame.

Use of the present invention involves positioning the leveling device adjacent the glass pane with at least one of the flat external leveling edges abutting a flat edge of the frame, temporarily affixing the device to the pane by depressing the suction cup toward and against the pane surface, and then adjusting the frame into the desired horizontal alignment with reference to the bubble level. A release tab is provided at the suction cup periphery to assist in removing the suction force and the device. Preferably, the planar body also includes a hook-shaped portion allowing a user to attach the device to an edge of the frame without the use of the suction cup. In this mode of operation, the leveling device is simply frictionally hung on the frame at any suitable edge. Furthermore, the preferred embodiment of the present invention also includes a foot surface providing a stable base for the device such that the device can be rested in an upright manner on a suitable edge of the frame. As a result, the preferred embodiment of the present invention can be used on a variety of picture frames and the like being attached either suctionably or in the described hooking or resting fashion. As a result, an overall object of the present invention is to overcome the difficulties of the prior art devices for horizontally orientating picture frames on a vertical wall.

Another object is to provide a leveling device for positioning a variety of wall fastened articles, including picture frames, posters, mirrors, and wall shelves.

A further object is to provide a leveling device for positioning frames and the like that is simple and easy to use.

Another object of the present invention is to provide a suction means for temporarily affixing a leveling device to a hanging article during the angular positioning operation.

Still another object of the invention is to provide a picture leveling device which can be manufactured economically.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWINGS

FIG. 3 is a plan view of the front side of the body of the preferred embodiment of the invention shown in FIG. 1.

FIG. 4 is a side plan view of the body of the preferred embodiment of the invention shown in FIG. 3 taken from the 4—4 line.

FIG. 5 is a perspective view of the preferred embodiment of the molded backing member.

DETAILED DESCRIPTION OF THE PREFERRED EMBODIMENT

Figure 1:
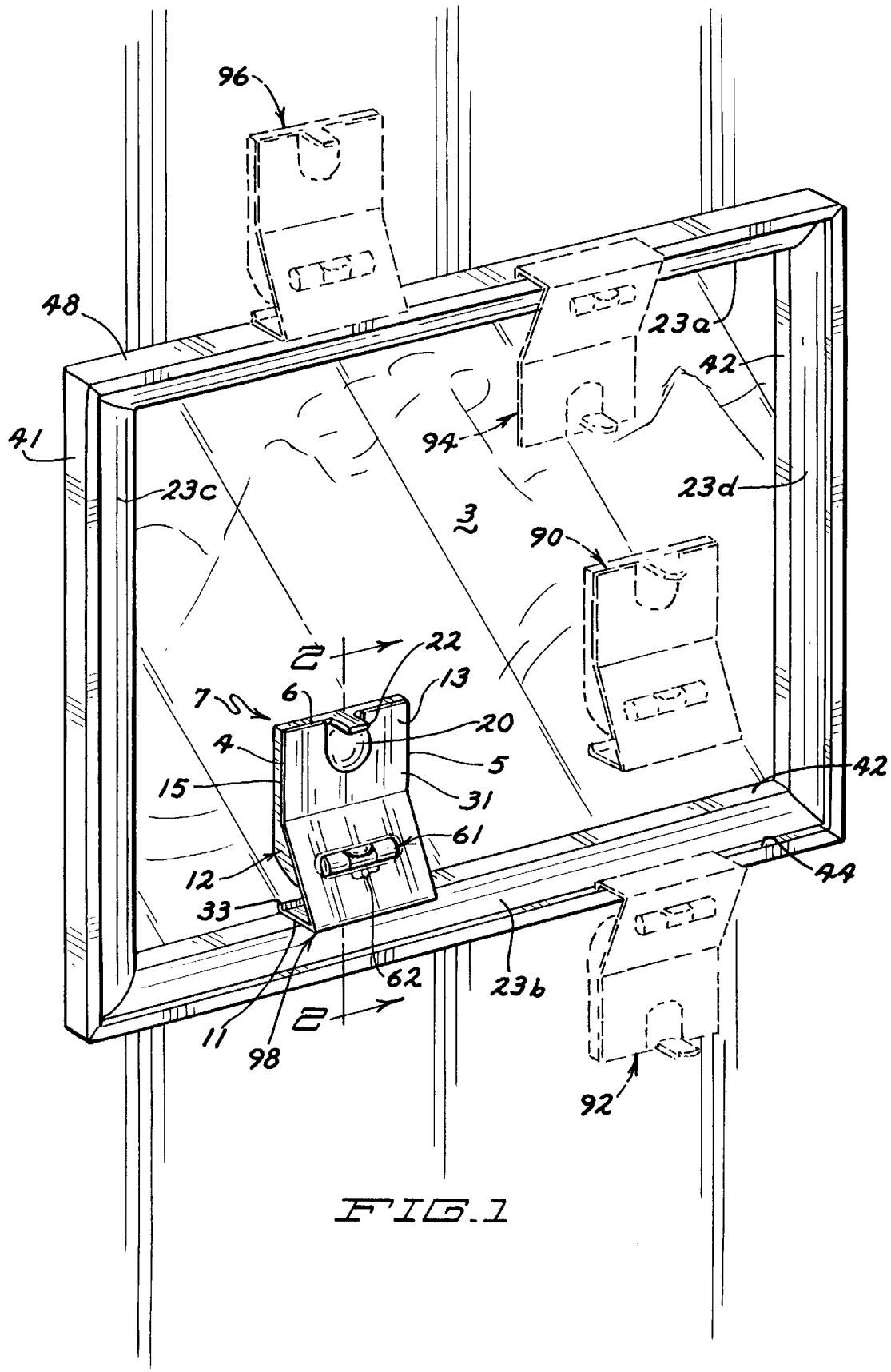
FIG. 1 is a perspective view of the preferred embodiment of the invention shown in the preferred positions on a frame.

Referring to FIG. 1, the device of the present invention, for positioning picture frames and the like on vertical wall surfaces, is shown as 7. Most simply and preferably the device 7 comprises a planar body 31 having a front face 13 and a back face 15 and having an affixed bubble level 61 provided with horizontal leveling indicia visible to the user from the front face 13 and also having an elastomer backing member 12 with a suction cup 20 affixed to the back face 15 of the planar body 31 for temporarily affixing the planar body 31 to the glass pane 3 or another smooth surface of a picture frame 41 or other hanging article. As will be discussed, the design and configuration of the planar body 31, including the overall rectangular shape, the hooking structure 10, and the foot surface 11 allows the device 7 to be used on a variety of picture frames, and other hanging articles. The apparatus may be any practicable size, though preferably easily hand graspable.

Figure 2:
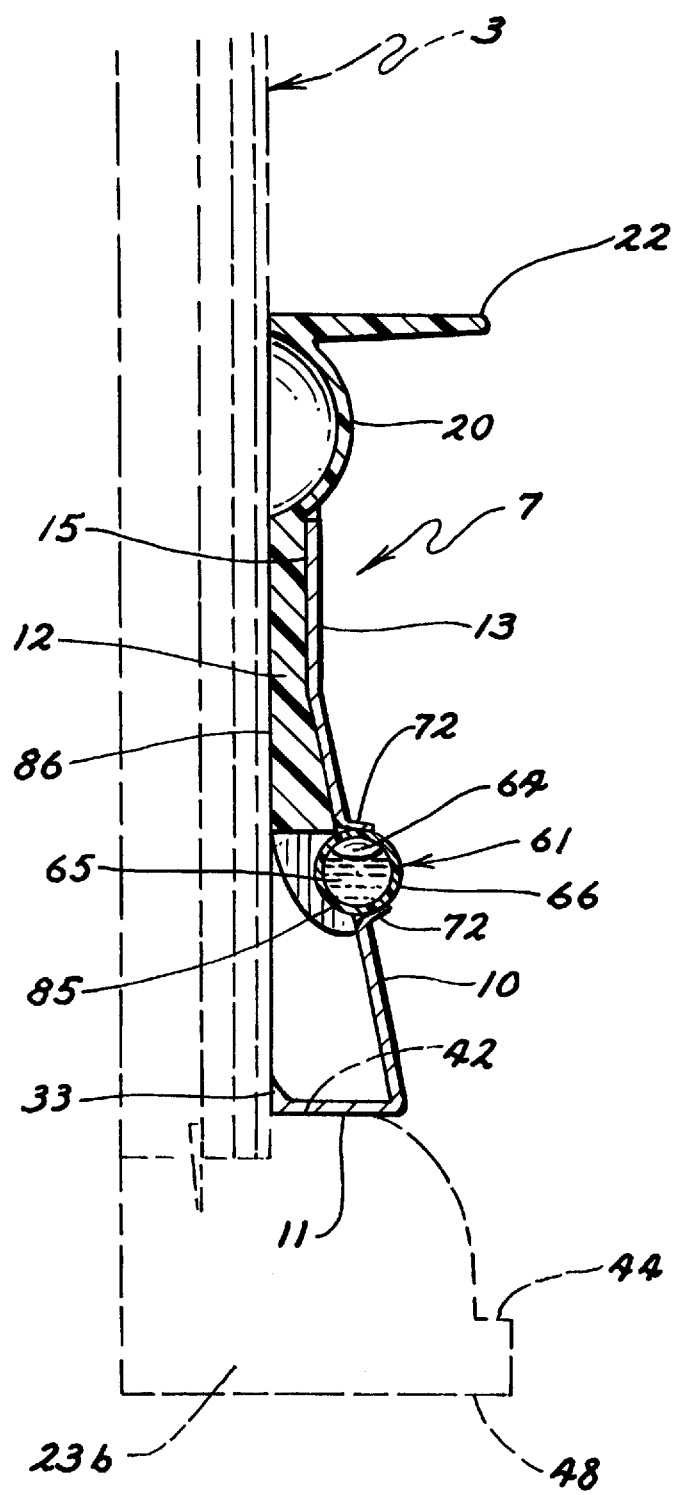
FIG. 2 is a cross sectional view of the preferred embodiment of the invention shown in FIG. 1 taken along the 2—2 line.

Referring to FIGS. 1–4, wherein like reference numerals designate like parts and assemblies throughout the several views, a leveling assembly of the present invention as illustrated in FIG. 1 is designated as 7 positioned on a picture frame 41. Picture frame 41 is typical of most frames, having a rectangular shape with top, bottom, left and right side frame members 23(a,b,c,d) forming a periphery around an enclosed glass pane 3. Each frame member 23 is typically formed with an identical cross section as shown in FIG. 2. Representative of many frames, the frame 41 of this disclosure includes a first flat interior surface 42 of the frame member 23 positioned adjacent the glass pane 3, a second flat interior surface 44 of the frame member 23 positioned away from the first interior surface 42, and a flat external surface 48 at the periphery of the frame member 23, all of which are surfaces onto which the present invention may be rested on or maintained against. Other frame styles may not have all three flat surfaces, but most will have at least the first flat interior surface 42 of the frame member 23 positioned adjacent the glass pane 3.

In the preferred embodiment the present invention is comprised of three parts: a substantially rectangular and planar body 31, an elongate bubble level 61 positioned on the planar body 31, and a backing member 12 with a suction cup 20 attached to the planar body 31 for temporarily affixing the planar body 31 to a picture frame 41 and for securing the bubble level 61 to the planar body 31.

Referring now to FIGS. 1, 3, and 4, the planar body 31 is overall rectangularly configured with a generally parallel right side leveling edge 5 and left side leveling edge 4 and a generally parallel top side leveling edge 6 and bottom foot surface 11.

In simplest terms, the preferred method of use of the present invention to level a picture frame 41 comprises initially the steps of temporarily affixing the device 7 to the frame 41 by placing the planar body 31 in a first preferred leveling position on the frame 41 with the rear abutting surface 86 of the backing member 12 generally adjacent the glass pane 3 and such that at least one of the external leveling edges 4, 5, 6 or the foot surface 11 abuts the first flat interior surface 42 of a frame member 23 adjacent the glass pane 3, then depressing the suction cup 20 toward and against the pane 3 whereby the device is suctionably affixed to the frame 41. Positioning of the device 7 in this first preferred leveling position is shown in FIG. 1 both at 98 and 90. The user then adjusts the picture frame 41, with both hands as necessary, into the desired horizontal orientation with reference to the bubble level 61. Removal of the assembly is facilitated by pulling the release tab 22 away from the pane 3, releasing the suction cup 20 force, and thus allowing the user to lift and remove the leveling device 7 without disturbing the just positioned frame 41.

Formed as a lower portion of the planar body 31 is a hooking structure 10 having surfaces defining a generally c-shaped cross sectional configuration and allowing the planar body 31 to be positioned on a frame 41 by simply hanging on a suitable surface of the frame 41. Use of the leveling assembly in this alternative manner is depicted at 92 of FIG. 1, where the device 7 is hanging from the second flat interior surface 44 of the bottom frame member 23b. Similarly, use of the leveling assembly 7 in this hanging fashion is depicted at 94 of FIG. 1, where the device 7 is hanging from the flat external surface 48 of top frame member 23a. As further shown in FIGS. 2 and 4, still another feature of the hooking structure 10 is a barb member 33 formed at a rear periphery of the foot surface 11 and extending generally along the entire transverse width of the planar body 31 and further assisting in maintaining the planar body 31 on the frame 41 when the above described hanging operation is used to temporarily affix the planar body 31 on the frame 41.

For frames lacking a glass pane 3 or otherwise lacking a suitable interior frame edge on which to position the planar body 31, this hooking structure 10, provides a second preferred leveling position for temporarily affixing the leveling device 7 to the frame 41.

Referring to FIGS. 3 and 4, the foot surface 11 of the preferred embodiment formed at a lower periphery of the hooking structure 10 of the planar body 31 generally extends the entire transverse width of the planar body 31 and is configured in size such that the entire leveling assembly can be rested upright on the bottom foot surface 11. As a result, for frames and the like with sufficiently wide flat interior or exterior surfaces, the leveling assembly 7 can simply be rested on the foot surface 11 without use of the suction cup 20 to temporarily affix the device to the frame. FIG. 1 show at 96 the leveling device 7 with the foot surface 11 resting on a flat external surface 48 of the top frame member 23a of the picture frame 41. Resting the present invention on the foot surface 11 on a suitable edge of the picture frame 41 provides a third preferred method of temporarily affixing the planar body 31 on the frame 41.

Referring again to FIGS. 3 and 4, formed on the planar body 31 are apertures for receiving portions of the bubble level 61 for securing the bubble level 61 to the back face 15 of the planar body 31. Elongate aperture 17 is formed in the planar body 31 and configured with substantially arcuate faces 72 at a periphery of the elongate aperture 17. The elongate aperture 17 allows the user to view substantially the bubble level 61 from the front face 13 of the planar body 31. The arcuate faces 72 of the aperture are concave in form when viewed from the back face 15 of the planar body 31 and are shaped to receive a portion of the bubble level 61 along a longitudinal axis 67 of the bubble level 61 as shown in FIGS. 3 and 4 such that the bubble level 61 and planar body 31 conform adjacent the arcuate faces 72. The bubble level 61 is maintained in place adjacent the arcuate faces 72 by a backing member 12 to be described below.

Important to providing an accurate leveling device 7, in this preferred embodiment the elongate aperture 17 and arcuate faces 72 are configured on the planar body 31 such that a longitudinal axis 67 of the bubble level 61 is aligned substantially parallel to the top external leveling edge 7 and the bottom foot surface 11 and substantially orthogonal to the left and right side external leveling edges 4, 5. Misalignment between the elongate aperture 17 and the edges 4, 5, 7 or the foot surface 11 may result in an inaccurate correspondence between the bubble level 61 data and the overall angular position of the picture frame 41.

Also formed as part of the planar body 31 is a suction cup cut-out 82 preferably positioned near the top edge of the planar body 31 and configured to receive the suction cup 20.

Preferably the planar body 31 is formed of stamped steel or another relatively easily deformable metal. However, a plastic or polymer planar body 31 is also practicable.

The second component of the preferred embodiment of the present invention is an elongate bubble level 61, simply a vial level well known in the art. Bubble level 61 is comprised of a sufficiently transparent vial 66 containing a liquid 65 and an air bubble 64. The air bubble 64 will be centrally disposed within the vial 66 and between a center window 62 when the planar body 31 is oriented in a substantially horizontal position.

The third component of the preferred embodiment of the present invention is the backing member 12 shown in detail in FIG. 5. Preferably molded, this component of the leveling device serves dual purpose in providing a suction cup 20 structure and for securing the bubble level 61 to the planar body 31. Formed of an elastomeric material, a suction cup 20 is easily deformable and configured as a suction cup well known to those skilled in the art. To assist in releasing the suction cup 20 from the glass pane 3 when the device 7 is affixed in the first preferred leveling position described above, a release tab 22 is provided at the periphery of the suction cup 20. Release of the suction force temporarily affixing the device 7 to the glass pane 3 is accomplished by gently pulling on the release tab 22 until the outer periphery of the suction cup 20 is displaced from the pane 3, thereby eliminating the suction force.

Again referring to FIGS. 2 and 5, the backing member 12 forms rear receiving surfaces 85 conforming to the shape of the bubble level 61 over at least a portion of the length of the bubble level 61 such that the level 61 is secured between the planar body 31 arcuate faces 72 and the receiving surfaces 85 of the backing member 12 when the backing member 12 is affixed to the planar body 31. The rear abutting surface 86 of the backing member 12 is generally planar and is in substantial contact with the glass pane 3 when the device 7 is used in the first preferred leveling position described above. The backing member 12 and planar body 31 are secured together either with mechanical fasteners or with adhesives (not shown).

It will be understood that variations and modifications may be effected without departing from the spirit and scope of the novel concepts of this invention.

What is claimed is:

1. An apparatus for assisting a user in fixedly positioning a framed article on a vertical wall surface, said framed article having a flat edge and a transparent surface, said apparatus comprising:

a) a body member having a front side and a back side and at least one flat external leveling edge, said body member being adapted to be located in a first leveling orientation with said at least one flat external leveling edge substantially abutting the flat edge of the framed article and said back side generally adjacent the transparent surface, said body member further having a hook structure for temporarily securing said body member to the framed article in a second leveling orientation, at least a portion of said hook structure projecting away from one of said sides of the body member;

b) a suction device secured to said body member for removably affixing said body member to the transparent surface of the frame when said body member is in said first leveling orientation; and c) a level device, said level device being observable to the user when said body member is in either said first or second leveling orientation.

2. The apparatus according to claim 1, wherein the level device is an encased, liquid filled tube having an air bubble that is movable within said tube in response to a change of an angular orientation of said tube.

3. The apparatus according to claim 1, wherein the body member further includes a foot surface for supporting the apparatus in an upright orientation when placed upon a generally horizontal surface.

4. The apparatus according to claim 1, wherein the hook structure extends generally laterally across the front side of the body member and is formed with a c-shaped cross section which opens rearwardly toward the back side of the body member.

5. The apparatus according to claim 4, wherein the hook structure further includes a barb member for at least partial contact with the framed article when the apparatus is in the second leveling orientation.

6. The apparatus according to claim 1, the level device having a longitudinal axis, said axis being in substantial parallel alignment with the at least one flat external leveling edge.

7. An assembly for assisting a user in leveling a picture frame, said frame having an internal edge, an external edge, and a transparent panel, said assembly comprising;

a) a body member having a front side and a back side and at least one generally flat external edge, said body member being adapted to be located in a first leveling orientation with said flat external edge substantially abutting the internal edge of the frame, said body member further having a hook structure for temporarily affixing the assembly to the at least one external edge of the frame in a second leveling orientation, at least a portion of said hook structure projecting away from said front side of the body member;

b) a suction cup secured to said body member for removably affixing the assembly to the transparent panel when said body member is in said first leveling orientation; and c) a bubble level, said level being observable to the user when said assembly is in either said first or second leveling orientation, said bubble level having a longitudinal axis, said axis being in substantial parallel alignment with said at least one flat external leveling edge of said body member.

8. The assembly according to claim 7, wherein the body member further includes a foot surface for supporting the assembly in an upright orientation when placed upon a generally horizontal surface.

9. The assembly according to claim 8, wherein the foot surface is formed as a portion of the at least one external edge of the body member.

10. The assembly according to claim 7, wherein the hook structure extends generally laterally across the front side of the body member and is formed with a c-shaped cross section which opens rearwardly toward the back side of the body member.

* * * * *